Oct. 6, 1970   A. VEGEBY   3,531,918
DEVICE IN ELECTROSTATIC PRECIPITATORS FOR
HIGH VOLTAGE SYSTEM SUPPORT INSULATORS
Filed July 12, 1968   2 Sheets-Sheet 2

INVENTOR:
ANDERS VEGEBY
BY
Howson & Howson
ATTYS.

United States Patent Office 3,531,918
Patented Oct. 6, 1970

3,531,918
DEVICE IN ELECTROSTATIC PRECIPITATORS FOR HIGH VOLTAGE SYSTEM SUPPORT INSULATORS
Anders Vegeby, Bandhagen, Sweden, assignor to Aktiebolaget Svenska Flaktfabriken, Stockholm, Sweden
Filed July 12, 1968, Ser. No. 744,462
Claims priority, application Sweden, July 31, 1967, 10,997/67
Int. Cl. B03c 3/74
U.S. Cl. 55—120                                    7 Claims

ABSTRACT OF THE DISCLOSURE

In an electrostatic precipitator having a tubular insulator for suspending the electrodes, the electrodes are suspended by a rod carried by a plate supported on the top of the insulator and having passageways therethrough. A closed high voltage chamber encloses at least two insulators and a protective gaseous medium is continuously injected into the chamber to cause flow downwardly through the passageways, and through the insulator around the rod. Uniform distribution of the gaseous medium among the insulators is provided by a cap which covers each support plate having the passageways and has a throttling opening, preferably controlled by a check valve.

---

Figure 1:
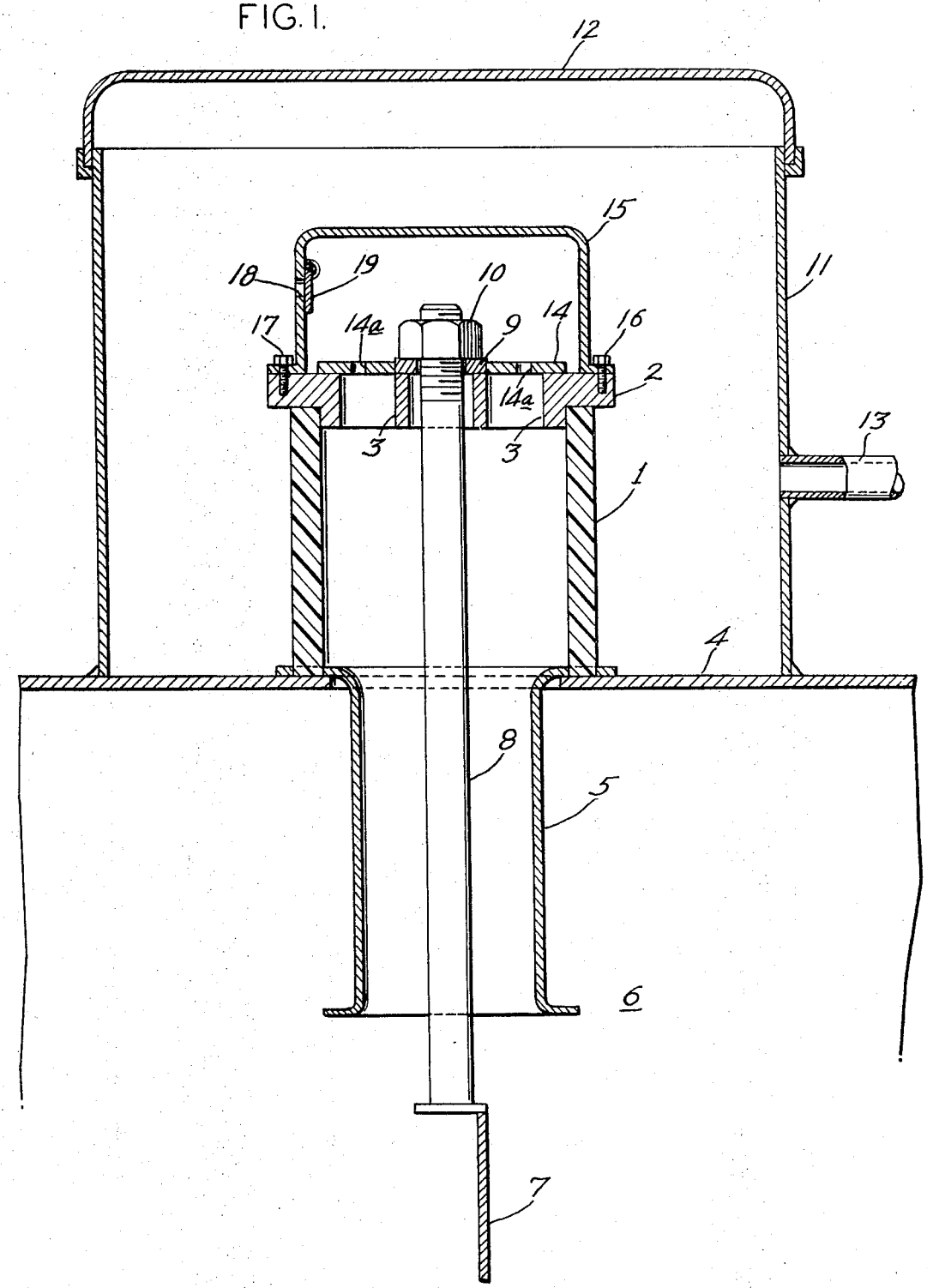

This invention relates to a device for protecting tubular high voltage insulators in electrostatic precipitators against both dust coatings and condensation of vapours.

In the operation of electrostatic precipitators for the cleaning of gases where the combination of dust properties and of condensable vapours contained in the gas is such, that dust accumulated on the high voltage insulators can absorb the condensed vapour, often special steps must be taken for preventing breakdowns. In many cases the dust is of such a resistivity, that satisfactory electric insulation is obtained also at the very high voltage required for the operation of electrostatic precipitators, even if there are minor coatings on the insulators. However, by condensation of vapours from the flue gas—a particularly usual phenomenon is condensation of water vapour—usually the resistivity of the dust is reduced and thereby involves the risk that flashovers are effected over the surface of the high voltage insulator. This risk is particularly pronounced when non-neutral constituents in the gas, either acid or alkalic ones, are condensed out in addition to water vapour. In connection with these problems it is of importance to consider that the precipitated dust may be hygroscopic, which makes that water vapour can be condensed at a partial pressure, which is substantially lower than what corresponds to the saturation temperature at the partial pressure in question. This circumstance is accentuated still more by the presence of acid or alkalic compounds in the gas which can result in a raising of the boiling point-condensation temperature. The adsorption of special gaseous components, for example $SO_3$, to the surface of the dust also may bring about disturbing effects.

A method often applied for preventing dust from accumulating on the high voltage insulators, which seldom can be prevented completely, and for preventing the diffusion of water vapour and of acid or alkalic compounds in the gas upwards to the high voltage insulators, is to supply to the high voltage chamber ventilation air or ventilation gas, which was treated so as to be free from dust and possibly freed of acid or alkalic constituents. This method per se is known since long, for example through Swedish patent specification 147,942. Hereby the gas quantity being supplied must so be limited that it does not disturb the gas distribution in the precipitator nor gives rise to the formation of small areas in the precipitator where the dielectric strength of the gas is substantially smaller than in the remaining parts of the precipitator. Disregard of this requirement will result in a limitation of the maximum voltage in the precipitator to values, which can prove less satisfactory in respect of the mode of operation of the precipitator.

Other problems of importance for the operation of electrostatic precipitators in this connection may be load changes, which give rise to changes of the pressure conditions in the electrostatic precipitator which in their turn bring about changes in the supply or barrier gas or barrier air or in the presence of gas components which by exothermic or endothermic reactions may cause sudden pressure changes due to positive or negative heat tone of the reactions. The invention has as its object to eliminate the problems which heretofore were connected with operation under such conditions.

The invention subject matter, thus, is a novel and improved construction of a device for protecting against dust coatings and/or condensation of vapours such insulators in electrostatic precipitators which are provided with an electrode system supported centrally by a tubular high voltage insulator in a rod, whereat the insulators, each of which being supported on a flange mounted about an opening in the precipitator roof and carrying a plate as well as a fastening means for said rod therein, are enclosed by a closed high voltage chamber common to two or more insulators, which chamber is provided with means for the supply of ventilation air or cleaned gas as protective medium, which is casued to flow downwards and into the precipitator chamber. The invention is characterized in that, for distributing the protective medium between the different high voltage insulators, the plate of each of the insulators is covered by a cap in which a small hole is made with a great pressure drop for ensuring a uniform distribution between the insulators, and that said plate is provided with a number of large openings and covered by a disk provided with a great number of small holes, thereby effecting a throttling with moderate pressure drop at the supply of protective medium to the space formed by the tubular insulator and said plate. In an expedient embodiment of the device according to the present application a stop valve is placed in the cap associated with every high voltage insulator, which valve prevents backward flow of the protective medium in the event of sudden pressure increases in some part of the chamber.

Figure 2:
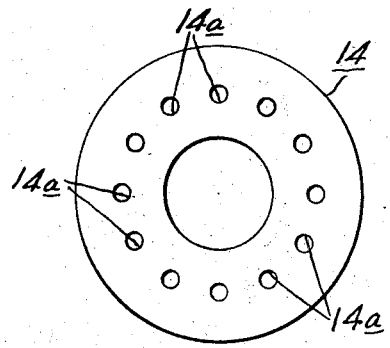
Figure 3:
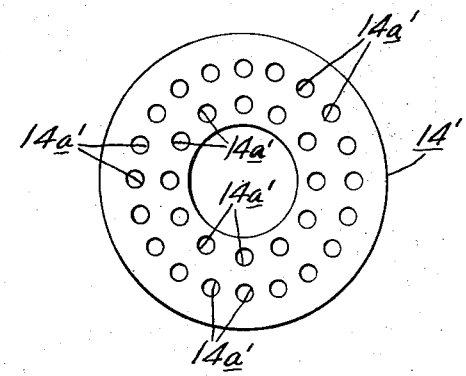
Figure 4:
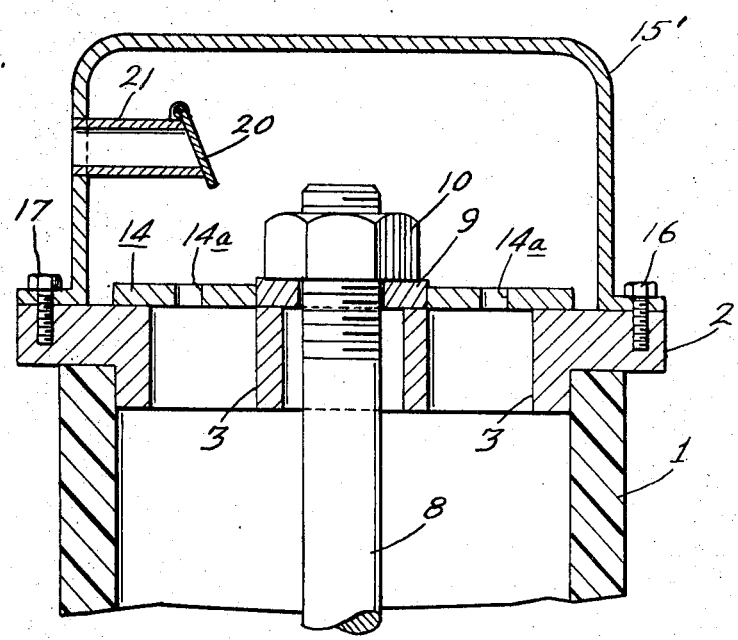

The invention is described in greater detail in the following, with reference to the accompanying drawings showing by way of example an embodiment of a protective device according to the invention, in which drawings:

FIG. 1 shows a cross-section through a high voltage chamber about a tubular insulator for an electrostatic precipitator, FIG. 2 and FIG. 3 show two construction embodiments of a disk for distributing the protective medium in the space within the tubular insulator, FIG. 4 shows an enlargement of the device for distributing the protective medium to the different high voltage chambers in an electrostatic precipitator.

In FIGS. 1 and 4 a high voltage insulator 1 in this case is assumed to be a cylindric body provided with a plate 2. The plate is provided with one or several large holes 3 for rendering it possible to clean the interior of the tubular insulator. The high voltage insulator is supported in principle by the roof 4 of the chamber of the electrostatic precipitator, and below the insulator is disposed a slightly constricted cylinder 5 made of metal. The object of said cylinder is to shield the high voltage insulator from the volume 6 of the electrostatic precipitator chamber proper.

In the electrostatic precipitator chamber there is suspended in rods 8 an emission system of a type known per se. Said rods are supported by the plates 2 with help of a washer 9 and nut 10. About the high voltage insulator is built up a high voltage chamber 11 with a cover 12. The aforementioned ventilation gas or ventilation air is supplied through a pipe socket 13. For obtaining a uniform distribution over the cross-section in the high voltage insulator, a liftable, exchangeable disk 14 is mounted above the plate 2 and perforated in such a way, that through the holes 14a in the disk 14 a suitable quantity of flash gas with a relatively low pressure drop is obtained. The holes may be placed, for example, as shown in FIG. 2 or 3. Hereby the volume flow of the jets from the holes in the disk 14 very rapidly will be distributed uniformly over the cross-section in the high voltage insulator 1, whereby a low and uniform speed is obtained in the entire space within the high voltage insulator 1 and the cylindric shielding cylinder 5. This results in a plain constriction of the gas volume in the high voltage insulator 1 and shielding cylinder 5, and turbulence in the space formed by 1 and 5 is avoided. For ensuring a uniform distribution between the different high voltage chambers of an electric precipitator chamber, a higher pressure drop is required. This is achieved by a cap 15, which is connected by bolts 16 and 17 to the aforementioned plate 2 and in which the protective medium is supplied through a smaller opening 18 with a relatively high pressure drop. By utilizing the pressure drop to its greater part at the inflow to the relatively large chamber formed by the cap 15 and plate 2, the kinetic energy of the jet through the opening 18 is given sufficient time by turbulence to convert into heat. From a temperature point of view this is per se not of interest, but it is of great importance for obtaining a uniform distribution of the gas through the holes 14a in the disk 14. For preventing the gas from flowing out backwards through the opening 18, the opening can be provided with a simple stop valve in the form of a freely suspended disk 19. At great pressure increases of such an amplitude, that the pressure in the precipitator chamber temporarily exceeds the pressure of the protective medium supplied through the pipe socket 13, the stop valve closes automatically and thereby prevents the outflow of unclean gas through the shielding cylinder 5 and the high voltage chamber 1. The stop valve, of course, can be designed in many different ways. FIG. 4 shows a construction where the valve disk 20 is mounted inclined in relation to the vertical line by being secured at the end of a pipe 21, which was cut off correspondingly inclined. Hereby the gravity assists in closing the valve disk at backward flow.

I claim:

1. In an electrostatic precipitator having an electrode system with upwardly projecting supporting rods, a tubular high voltage insulator for each rod carrying a plate with fastening means for suspending said rod centrally within said insulator, and wall means forming a closed high voltage chamber enclosing the upper ends of at least two insulators; means for protecting said insulators against dust coatings and condensation of vapors comprising means for continuously supplying protective gaseous medium to said high voltage chamber, means forming a great number of small passageways through said plate for downward flow of said protective medium from said chamber through the interior of said tubular insulator around said rod, and an individual cap for each insulator covering the top of each insulator including said plate, each of said caps having a small hole affording flow of the protective medium from said chamber into said passageways, said hole providing a great pressure drop for insuring uniform distribution of the protective medium between the insulators.

2. Apparatus according to claim 1 including a non-return valve mounted so as to cooperate with the hole in the cap to inhibit reverse flow of gas upon pressure increase within the precipitator.

3. Apparatus according to claim 2 wherein said cap has a pipe projecting inwardly therethrough to form said hole, the inner end of said pipe being inclined, said valve comprising a disc cooperable with said inclined end to close the hole by gravity and to open the hole by the flow of the protective medium through said pipe.

4. Apparatus according to claim 2 wherein said cap is fastened to said plate, and said plate is supported on said insulator.

5. Apparatus according to claim 4 wherein the walls defining said closed high voltage chamber include a blow-off cover.

6. Apparatus according to claim 1 wherein said passageway forming means through said plate comprises at least one large hole in said plate and a liftable exchangeable disc seated on said plate in registry with said hole and having perforations providing said passageways therethrough.

7. Apparatus according to claim 1 wherein said precipitator includes a restricted cylindrical member surrounding said rod below said insulator through which said protective medium must flow, the restriction of said cylinder shielding the insulator from the interior of said precipitator.

References Cited

UNITED STATES PATENTS

| | | | |
|---|---|---|---|
| 1,091,295 | 3/1914 | Combs. | |
| 1,468,858 | 9/1923 | Curran. | |
| 3,033,918 | 5/1962 | Wiemer | 55—120 X |
| 3,362,134 | 1/1968 | Wiemer | 55—146 X |

FOREIGN PATENTS

| | | |
|---|---|---|
| 512,252 | 10/1920 | France. |
| 1,322,138 | 2/1963 | France. |
| 814,257 | 6/1959 | Great Britain |

DENNIS E. TALBERT, JR., Primary Examiner

U.S. Cl. X.R.

55—146, 148; 174—16, 31, 187, 211